United States Patent [19]

Tramposch et al.

[11] 4,057,011
[45] Nov. 8, 1977

[54] MEANS FOR PRINTING OCR AND BAR CODE ON CARDS

[75] Inventors: Herbert Tramposch, Riverside, Conn.; Michael Polad, Mendota, Minn.

[73] Assignee: Malco Plastics, Garrison, Md.

[21] Appl. No.: 663,178

[22] Filed: Mar. 2, 1976

Related U.S. Application Data

[63] Continuation of Ser. No. 520,679, Nov. 4, 1974, abandoned, which is a continuation-in-part of Ser. No. 456,643, April 1, 1974, abandoned.

[51] Int. Cl.$^2$ ............................................. B41J 1/10
[52] U.S. Cl. ................................. 101/93.03; 101/18
[58] Field of Search ............ 101/18, 93.03, 93.31, 101/93.32, 93.33, 93.47, 407 BP; 197/17, 23, 26, 35, 98, 106, 149

[56] References Cited

U.S. PATENT DOCUMENTS

| | | | |
|---|---|---|---|
| Re.27,809 | 11/1973 | Drillick | 101/18 |
| 989,820 | 4/1911 | Stickney | 197/DIG. 2 |
| 1,146,578 | 7/1915 | Kidder | 197/127 |
| 2,277,884 | 3/1942 | Robbins | 101/305 |
| 2,868,345 | 1/1959 | Nitschke | 197/17 |
| 2,900,062 | 8/1959 | Nitschke | 197/17 |
| 3,090,297 | 5/1963 | Wilkins et al. | 101/93.03 |
| 3,139,820 | 7/1964 | Kittler | 101/93.31 |
| 3,144,821 | 8/1964 | Drejza | 101/93.03 |
| 3,490,366 | 1/1970 | Benson et al. | 101/93.33 |
| 3,584,574 | 6/1971 | Smith | 101/93.33 |
| 3,742,848 | 7/1973 | Huntoon et al. | 101/93.14 |
| 3,757,684 | 9/1973 | Drillick | 101/18 |
| 3,795,187 | 3/1974 | Babler | 101/93.3 |
| 3,820,455 | 6/1974 | Hencley et al. | 101/93 |

FOREIGN PATENT DOCUMENTS 1,224,696  3/1971  United Kingdom .................. 101/93

OTHER PUBLICATIONS

IBM Tech. Disc. Bulletin, Pass Book for Disk Printer, Delapchier, vol. 13, No. 8, Jan. 1971.

*Primary Examiner*—Russell R. Kinsey
*Assistant Examiner*—Paul J. Hirsch
*Attorney, Agent, or Firm*—Fleit & Jacobson

[57] ABSTRACT

A printing apparatus for the printing of OCR and bar codes on identification cards, credit cards and the like. The card is conveyed intermediate a plurality of selectively operable print bars and pressure bars. The pressure bars are held in position by biasing means selected to provide regulated backing pressure to the credit card to achieve controlled printing pressure. This combination results in high quality OCR and bar code print out.

4 Claims, 6 Drawing Figures

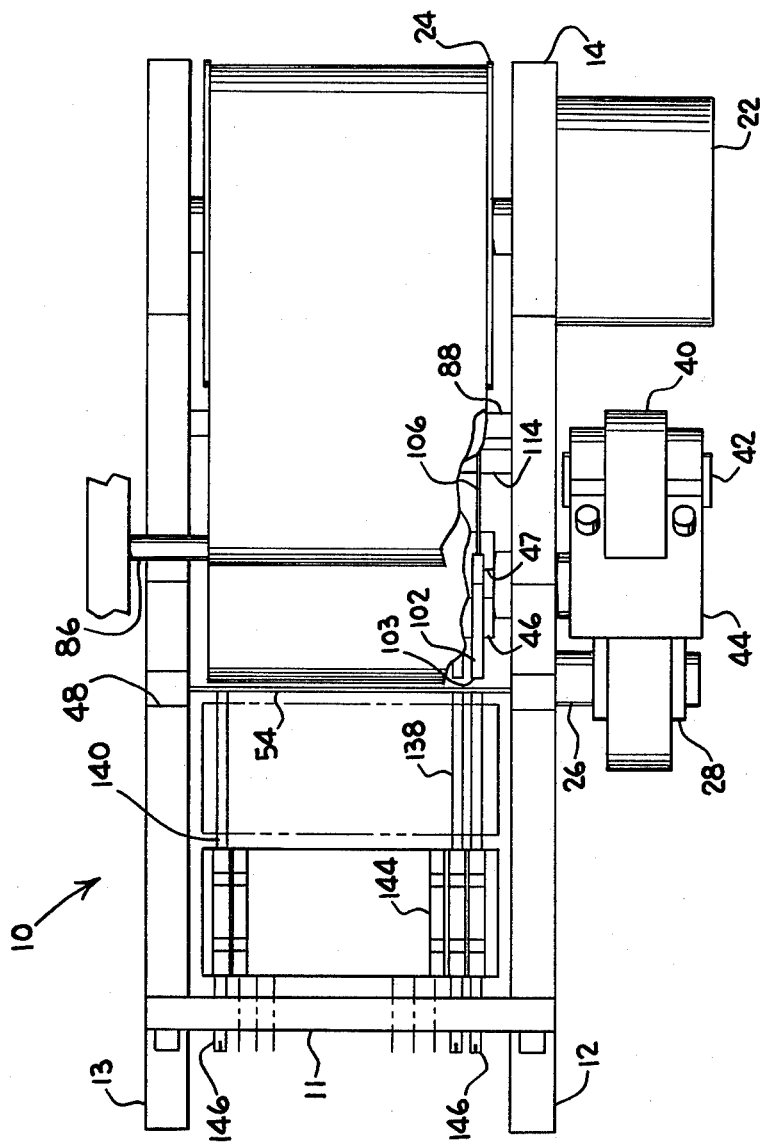
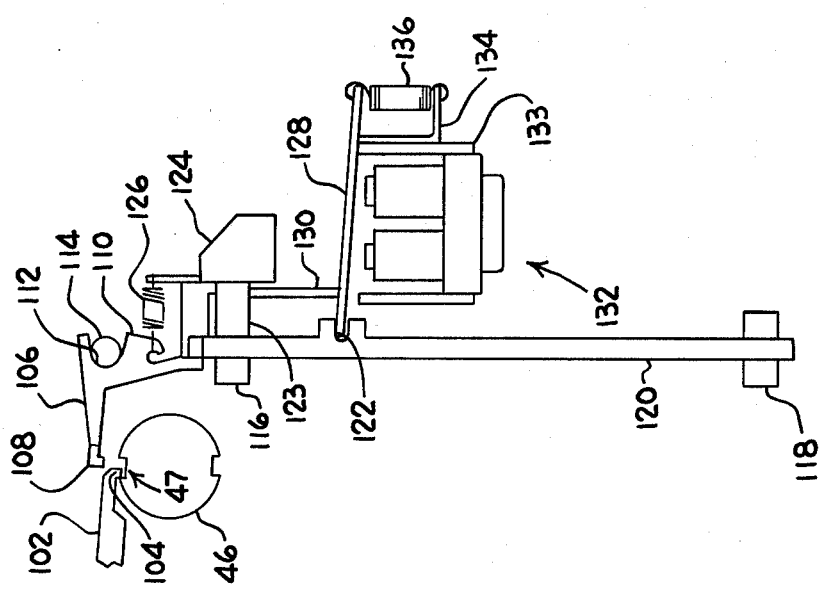

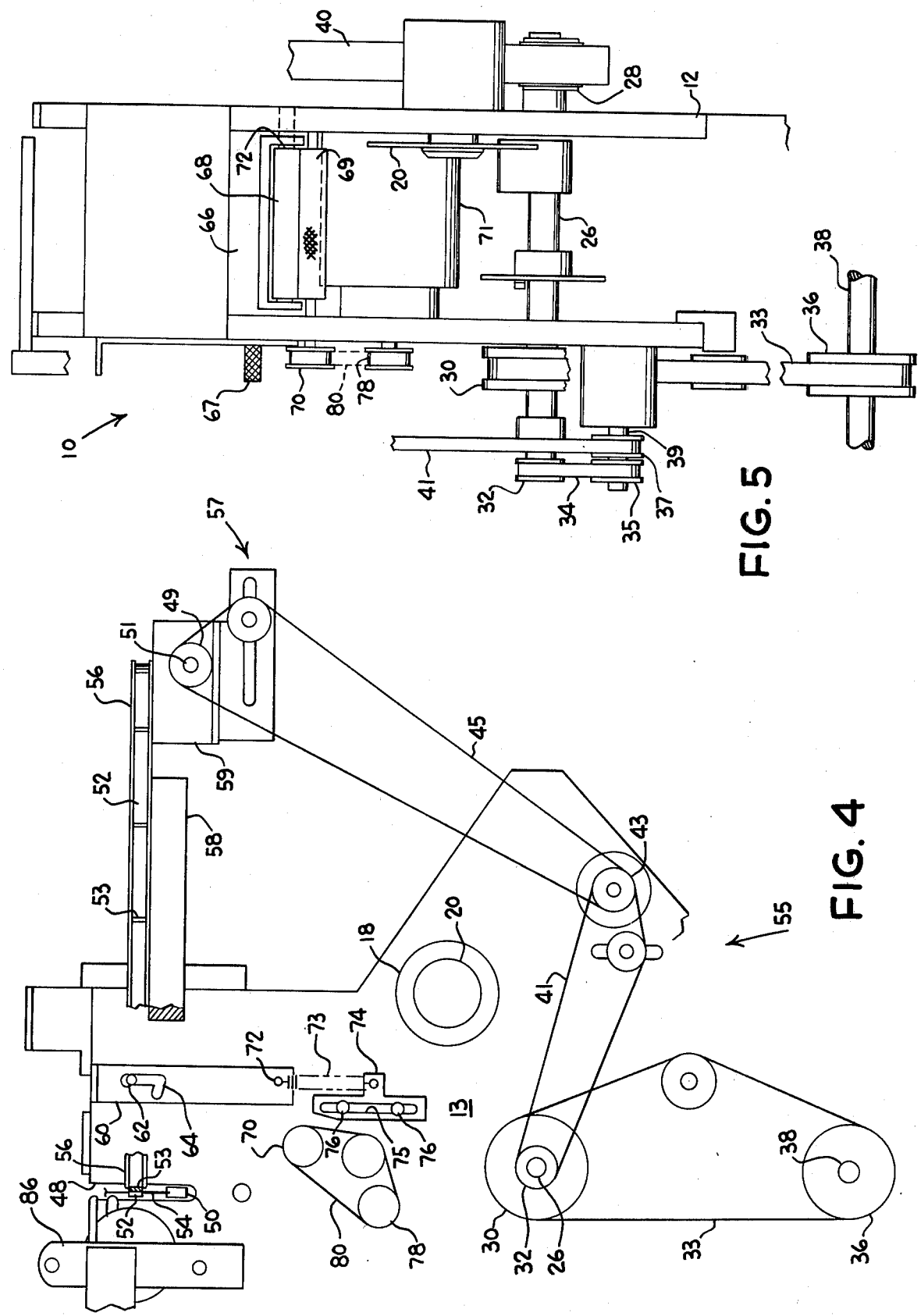

MEANS FOR PRINTING OCR AND BAR CODE ON CARDS

CROSS REFERENCES TO RELATED APPLICATIONS

This is a continuation of application Ser. No. 520,679 filed Nov. 4, 1974, now abandoned which was a continuation-in-part of the patent application having Ser. No. 456,643 and filed Apr. 1, 1974 now abandoned.

BACKGROUND OF THE INVENTION

In the manufacture of plastic cards such as identification cards, credit cards, medical record cards, and the like, a number of operations are performed on such cards. The cards may be embossed, magnetic tapes applied thereto, photographs secured to the same, signature panels applied, and many other operations which are well known in the art. One of the most exacting operations is the applying to these cards of coded symbols such as character sets for optical character recognition (hereinafter called OCR for convenience) and bar codes, such as UPC (universal product code) which may be read with appropriate optical reading systems. Systems of this type are described in the book "Optical Character Recognition" by Fisher, Pollock, Raddock and Stevens, Library of Congress Card Number 63-20445. It is highly desirable that the printing of the coded symbols be very precise so that high quality printing results. If the coded sumbols have sharp images, good color contrast, and proper orientation, they are more easily readable by the appropriate reading systems. In fact, the degree of sophistication for the reading system is inversely proportional to the quality of the printed coded symbols.

Although machines have been made heretofore to apply OCR and bar codes to a card, more to date has been able to achieve the quality desired with the high speed necessary for the economic production of such cards. Generally, these coded symbols have been placed upon a panel and then the panel applied to the card by appropriate means. Usually the card then has a protective overlay disposed upon the panel bearing these coded symbols.

One interesting method of performing an operation on a credit card is disclosed in U.S. Pat. No. 3,757,684 issued to Jacob H. Drillick. This U.S. patent discloses a method for embossing a credit card. Selectively operable punch and die pairs are provided with cooperating interposers wherein a credit card may be embossed by the simultaneous movement of the punch and die. Although U.S. Pat. No. 3,757,684 discloses apparatus which is highly efficient for the embossing of cards, attempts to apply the use of this apparatus for the printing of coded symbols upon the cards was found to be less satisfactory. The primary difficulty in using the apparatus disclosed by Drillick for the printing of OCR and bar codes is the fact that cards such as credit cards normally have a plus or minus 10% variation in thickness. Although this variation in thickness is not critical in the embossing operation, it becomes highly detrimental where precise printing pressure must be applied. To achieve the high quality printing desirable for OCR and bar code printing, certain desirable features of the apparatus disclosed in U.S. Pat. No. 3,757,684 have ben incorporated into a printing apparatus which yields the high quality printing desirable with a high rate of production, and reference may be made to said patent for a detail description of portions which form part of this invention.

SUMMARY OF THE INVENTION

A printing apparatus is provided having a plurality of printing bars which may be actuated by appropriate control means. The font of the printing bars may be bar codes or alphanumerics in the form required for optical code recognition. Spaced relative to the printing bars in a one to one relationship are a plurality of pressure bars. The pressure bars are limited in the extent to which they move toward the printing bar by a positive stop and they are inhibited in their movement in the direction away from the printing bar by a biasing means. The biasing means is selected to statically load the pressure bar in accordance with the printing force supplied to the printing bars. The card to be printed is conveyed between the printing bars and the pressure bars with appropriate printing medium being located between the card and the printing bar. As the card moves past the various printing bars, the same are selectively actuated to impart the desired combination of coded symbols onto the card.

DESCRIPTION OF THE DRAWINGS

FIG. 2 shows a top view, partially in section, of the printing apparatus of FIG. 1.

FIG. 4 is also a side view of the apparatus shown in FIG. 1 but of the side opposite that shown in FIG. 3.

FIG. 5 is a front view of the printing apparatus shown in FIG. 4 taken along the lines 5—5 with portions removed for clarity.

FIG. 6 is a side view of the actuating mechanism of the apparatus shown in FIG. 1 in the disabled state.

DESCRIPTION OF THE PREFERRED EMBODIMENT

Figure 1:
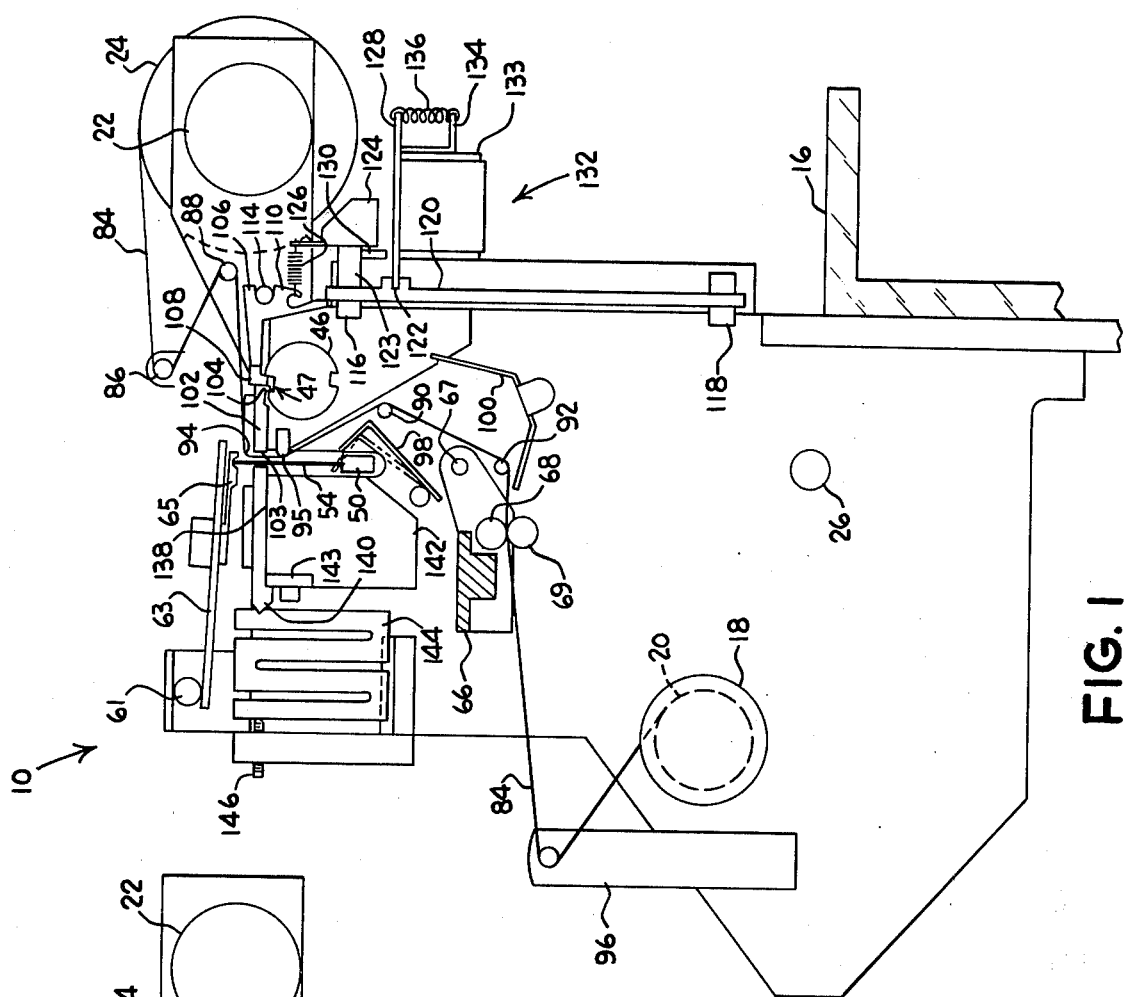
FIG. 1 shows a cross-sectional view of a printing apparatus which incorporates the principals of this invention, the apparatus being in an enabled state.

A printing apparatus for the printing of coded symbols on cards is shown generally at 10 in the form of a module which is a part of a processing unit that performs many operations on a plastic card such as embossing, tipping, the applying of a protective coating, and the like. The module 10 includes a housing 11 having side plates 12, 13 which side plates have a tab 14 that is a part thereof. The side plates 12, 13 are secured to a beam 16 which extends along the entire length of the processing unit (not shown) to provide support for various modules. One of the side plates 12 has a torque motor 18 received therein which torque motor is operably connected to a takeup reel 20. One tab 14 has a torque motor 22 received therein which torque motor is operatively connected to a supply reel 24. Extending between and rotatably received within the side plates 12, 13 is a drive shaft 26 which has an eccentric 28 secured on one end. Disposed on the other end of the drive shaft 26 are a pair of pulleys 30, 32. The first pulley 30 receives a drive belt 33 which is in operative engagement with a pulley 36 that is driven by a main drive shaft 38 that provides drive for the entire processing unit. The second pulley 32 receives in belt 34 that drivingly engages a pulley 35 which is spaced relatively to another pulley 37 which is secured to a drive shaft 39.

A belt 41 is disposed about pulley 37 and another pulley 43. A belt 45 is received about pulley 43 and another pulley 49 that is attached to a drive shaft 51. Tension adjusting means 55 and 57 are provided for the belts 41 and 45, respectively.

A connecting rod 40 rotatably receives the eccentric 28 within one end thereof and a crank pin 42 within its opposite end. The crank pin 42 in turn is rotatably disposed within a crank arm 44 that receives a bale shaft 46, which bale shaft has a recess 47 therein. The side plates 12, 13 have a groove 48 at their upper portions wherein a lower card rail 50 is disposed that is adapted to receive a card 54, such as a plastic card of the size used for credit cards. A continuous belt 52 having longitudinally spaced projections 53 travels within the groove 48 immediately above the lower card rail 50. An index station assembly 56 is provided to receive the belt 52 thereby providing a guide means. The index station assembly 56 is supported by a beam 58 and a drive housing 59 which contains means (not shown) that cooperate with the drive shaft 51 to provide drive to the belt 52. Positioned immediately above the plates 12, 13 is a cover 63 which is rotatably connected to a hinge pin 61. Secured to the bottom of the cover 63 is a grooved finger 65 that is adapted to receive the upper edge of the card 54 thereby providing upper guide means thereto.

Located adjacent each of the side plates 12, 13 is a pinch roller lift arm 60 each of which is supported by a shaft 62 which is fixedly secured to the side plates. Each pinch roller lift arm 60 contains a slotted guide 64 which can constrain the life arm 60 to its uppermost position. Within the two side plates 12, 13 is pinch roller housing 66 which is rotatably attached to the side plates 12, 13 by two pinch roller housing retainers 67, one of which is attached to each side plate. A pinch roller 68 is rotatably attached to the pinch roller housing 66. A knurled roller 69 is rotatably attached to each side plate 12, 13 and has a pulley 70 attached to one end thereof. A stepper motor 71 is secured with the side plate 12 and has a pulley 78 extending therefrom. A belt 80 engages the pulleys 70, 78 to provide drive to the knurled roller 69. A pinch roller lift rod 72 extends through the pinch roller housing 66, through openings in the side plates 12, 13 and through each pinch roller lift arm 60. On each side, a tension spring 73 connects the ends of the pinch roller lift rod 72 to an associated spring bracket 74. Each spring bracket 74 has a longitudinal opening 75 which receives a pair of pins 76 that are secured to the side plates 12, 13. In normal operation, the springs 73 force the pinch roller 68 into contact with the knurled roller 69. The pinch roller lift arms 60 may be locked in their upper position by the slotted guides 64, thereby producing a gap between the pinch roller 68 and the knurled roller 69 to facilitate threading of an ink ribbon 84.

The ink ribbon 84 is disposed about the support reel 24 and extends over a supply ribbon tension arm 86, a plurality of rollers 88, 90 and 92, a pair of guide bars 94 and 95 and a takeup ribbon tension arm 96 to be conveyed from the supply reel to the takeup reel 20. The module 10 has included therein an upper ribbon threading guide 98 and a lower ribbon threading guide 100 to aid in the insertion of the ink ribbon 84 into the module.

Positioned at the top of module 10 are a plurality of juxtaposed print bars 102, with individual fonts 103 at one end thereof, which are adapted for horizontal movement. The print bars 102 have tail portions 104 which are receivable by the recess 47 of the bail shaft 46. Spaced relative to each of the print bars 102 is an interposer 106 which has a tip 108 at one end thereof and a hook member 110 at the opposite end. Additionally, the interposers 106 have a generally circular recess 112 which receive a pivot shaft 114 about which the interposers are pivotable. Secured to the side plate 12 is a transversely extending upper stop bar guide 116 and a transversely extending lower stop bar guide 118, each of which receives one of an interposer stop bar 120, each stop bar being associated with an interposer 106. Each interposer stop bar 120 has a recess member 122 therein and an upper stop bar guide cap 123 to which an interposer spring bracket 124 is attached. Each spring bracket 124 cooperates with its associated interposer hook 120 to support a tension spring 126.

Located adjacent the interposer stop bars 120 are a plurality of armatures 128 and armature stops 130. Below each armature 128 is a magnetic assembly 132 having a housing 133 upon which the associated armature 128 rests. A bracket 134 extends from each housing 133 and in combination with its associated armature 128 supports an extension spring 136. Normally, the magnetic assemblies 132 and associated components are aligned vertically by threes, or fractions thereof, a sufficient number of sets of three being provided to match the number of print bars 102 and interposers 106. For convenience, only one magnetic assembly 132 is shown.

Spaced relative to each print bar 102 is a horizontally extending pressure bar 138 having a bar tail 140 at one end thereof. Each pressure bar 138 is supported by a generally rectangular support member 142 of the housing. Attached to the support member 142 is a stop plate 143 which forms a stop for the pressure bar 138 through cooperation with the bar tail 140. A bar spring 144 engages each of the pressure bars 138 and tends to mount the biasing force upon each pressure bar 138 towards the support member 142. An adjusting screw 146 is received within the housing 11 to adjust the biasing force of the spring 144.

In operation, the plastic card 54 is transported intermediate the print bars 102 and pressure bars 138 by the index belt 52 in cooperation with the lower card rail 50 and guide finger 65. All printing operations are timed with respect to the bale shaft 46, which is constantly driven in an oscillating rotary motion in synchronization with all modules of the entire processing unit. Printing is achieved when the interposed 106 is enabled as shown in FIG. 1. FIG. 6 shows the interposer in its disabled condition.

The printing steps will now be described in connection with the printing apparatus 10. When a control unit (not shown) indicates that a card 54 is to be printed with a particular character at a given point on the card, this given point will be indexed past the print bar 102 containing the particular character of the type font and its associated pressure bar 138 as it will be indexed past every other combination print bar and pressure bar. When the given point on the card is indexed past the print bar containing the particular character, the control unit will send a signal to the magnet assembly 132 for the appropriate print bar 102, energizing the associated magnetic assembly 132 and closing its corresponding armature 128. This closing of the armature 128 lowers the interposer stop bar 120 thus causing the interposer tip 108 to be pulled into the recess 47 by the extension spring 126.

When the interposer stop bars 120 are elevated as shown in FIG. 6 the interposer tip 108 remains in the withdrawn position. There is enough free play for the print bar 102 in the recess 47 with the interposer tail 108 removed so that there is no contact to force the print bar against the card 54. When the interposer stop bar 120 is withdrawn, as shown in FIG. 1, the interposer rotates about the shaft 114 and the interposer tail 108 falls into the bale recess 47 where it will engage the print bar 102 and be in a position to actuate the same. The module is then in its printing position.

More specifically, as the bale shaft approaches its most clockwise position, a signal is transmitted to the control unit. If it is desired to print a character the appropriate magnet assembly 132 is enabled when a signal is received from the control unit. Upon a magnet assembly 132 being enabled, the armature 128 is drawn by magnetic attraction to the magnet assembly 132 and pulls its associated interposer stop bar 138 downwardly to disengage the interposer 106 and stop bar. This allows the spring loaded interposer 106 to rotate counterclockwise about the interposer pivot shaft 114 until the interposer tail 108 is fully received within the bale shaft recess 47. As the bale shaft 46 then begins to rotate in a counterclockwise direction, the interposer 106 is driven to the left, as seen in FIG. 1, thereby pushing the print bar 102 towards the card 54.

The pressure bar 133 to the left of the print bar 102 is statically loaded by the bar spring 144 with an appropriate loading for the individual foot 103 on bar 102, as for example 90 pounds which loading is adjustable by screw 146. When the bale shaft 46 reaches its most counterclockwise position, the print bar 192 closes with the pressure bar 138, which moves a short distance of the stop 143, as for example approximately 0.010 inches, and the appropriate font 103 strikes a portion of the print ribbon 84 to the credit card 54 with an appropriate printing force, as for example, 100 pounds.

After the character is printed, the bale shaft 46 begins to rotate clockwise, and the print bar 102 and the interposer 106 are driven to the right by the left edge of the bale shaft recess 47. As the interposer 106 moves to the right, it also rotates clockwise relative to shaft 114 an the bottom of the interposer 110 will move to the left of interposer stop bar 120. The magnet assembly 132 simultaneously is disabled, releasing the armature 128 which is then forced upwardly by the spring 136. This action lifts the interposer stop bar 120 and locks the interposer 106 in its inactivated position as shown in FIG. 6. If it is desired to repeat printing the same character on the next cycle of the bale shaft 46, the magnet assembly is not disabled between cycles and the interposer 106 remains in the bale shaft recess 47.

Figure 3:
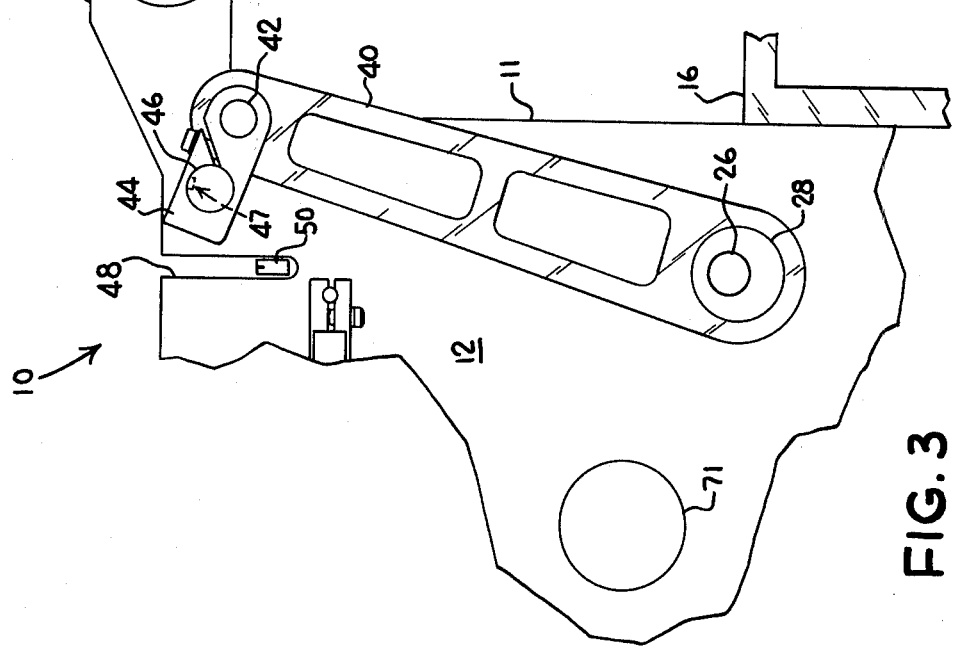
FIG. 3 shows a partial side view of the printing apparatus of FIG. 1.

The bale shaft 46 is imparted with oscillating rotatory motion as follows: The module drive shaft 26 is driven at a constant speed by the belt 33 which is driven by the main system drive shaft 38. The bale shaft 46 drive system is basically a four bar linkage as shown in FIG. 3. The eccentric 28 is rigidly attached to the module drive shaft 26 and the crank arm 44 is rigidly attached to the bale shaft 46. The connecting rod 40 is rotatably connected to the crank arm 44 by a crank pin 42 and to the eccentric 28. Consequently, as the driven shaft 26 rotates, the eccentric 28 will drive the connecting rod 40 in a motion such that oscillating clockwise and counterclockwise motion is provided to the bale shaft 46.

The path of the ribbon 84 is shown in FIG. 1. The ribbon may be advanced, upon command by the control unit, by any appropriate distance, as for example 0.330 inches, during 30 miliseconds of a 60 milisecond cycle.

The ribbon 84 is advanced by the action of the knurled roller 69 which is driven by the stepper motor 71. The ribbon tension is maintained by torque motor 22 connected to takeup and supply reels 20 and 24 respectively. The tension arm 96 is provided between the knurled roller 69 and the supply reel 120 to keep the ribbon tension from exceeding a maximum value during an incremental advance and to lessen the stepper motor torque requirement. Sensing devices may be associated with the tension arm 96 to detect a rupture in the ribbon and allow appropriate action to be taken.

The apparatus has been shown and described with the fonts 103 being a part of one end of the print bars 102. It will be appreciated that the fonts 103 may be located on the ends of the pressure bars 138 spaced relative to the print bars 102 and, by repositioning the ink ribbon 84, printing may be accomplished on the other side of the card 54 shown in FIG. 1.

What is claimed is:

1. A printing apparatus for printing bar codes, OCR and the like on cards, the combination comprising:
    A. a housing;
    B. a plurality of selectively and independently operable print bars slidably supported by the housing;
    C. a plurality of interposers, one of said interposers being operatively engagable with each print bar;
    D. a bail shaft;
    E. drive means for imparting continuous oscillating rotary motion to the bail shaft;
    F. a plurality of pressure bars supported by said housing,
        1. one pressure bar being spaced relative to each print bar,
        2. each said pressure bar having a stop projection thereon, and
        3. said pressure bars being movable in a direction substantially parallel to the sliding movement of said print bars;
    G. stop means on said housing for engaging said stop projection to limit the movement of the pressure bars in the direction toward the printing bars;
    H. one of the plurality of print bars and plurality of pressure bars carrying particular font characters;
    I. a plurality of springs, one each of said springs independently urging each pressure bar toward its associated print bar, and said stop projection into contact with said stop means;
    J. means for individually adjusting the pressure exerted and appropriately to the respective font character by each of said springs upon said pressure bars;
    K. means for positioning a printing medium between the print bars and the pressure bars;
    L. means for placing the card between the printing bars and the pressure bars; and
    M. means for selectively operatively engaging an interposer with the bail shaft to selectively transmit the continuous motion of the bail shaft into a motion of a print bar toward and away from its associated pressure bar for printing engagement to move the pressure bar off its stop against said appropriate spring pressure for the font character to be printed.

2. The apparatus of claim 1 wherein said biasing means is a bar spring.

3. In a printing apparatus for the printing of OCR and bar code characters, the combination comprising:
    A. a housing;

B. a plurality of selectively and independently operable juxtapositioned printing bars slidably supported by said housing, each having a tail member at a first end;

C. a plurality of pressure bars supported by said housing,
1. one pressure bar being spaced relative to the second end of each printing bar,
2. each said pressure bar having a stop projection thereon, and
3. said pressure bars being movable in a direction substantially parallel to the sliding movement of said printing bars;

D. stop means on said housing for limiting the movement of the pressure bars in the direction toward the printing bars;

E. font characters on respective bars of one of the plurality of print bars and plurality of pressure bars;

F. a plurality of springs, each supported by said housing and engaging the pressure bars at their ends opposed to the printing bars, each of said springs being operative to inhibit the movement of each pressure bar in the direction away from its associated printing bar and to urge the associated stop projection into contact with said stop means;

G. means for individually adjusting the pressure exerted by each of said springs upon said pressure bars appropriately to the respective font character;

H. means for positioning a printing medium between the printing bars and the pressure bars;

I. means for placing a card intermediate the pressure bars and the printing bars;

J. a bail shaft supported within said housing beneath the first ends of the printing bar and having a longitudinally extending recess that receives the tail members of the printing bars therein;

K. means for imparting oscillatory rotary movement to the bail shaft;

a pivot shaft extending generally parallel to the bail shaft;

M. a plurality of interposers having tail members at one end thereof pivotably supported by the pivot shaft, each interposer being spaced relative to the first end of a printing bar;

N. each tail member being located relative to the bail shaft so as to be received within the bail shaft recess upon the pivoting of its associated interposer about the pivot shaft;

O. means for pivoting the interposers about the pivot shaft; and

P. means for selectively controlling the pivoting means.

4. The apparatus of claim 3 wherein said biasing means is a bar spring.

* * * * *